United States Patent [19]

Harvey et al.

[11] Patent Number: 5,284,499
[45] Date of Patent: Feb. 8, 1994

[54] METHOD AND APPARATUS FOR DRAWING OPTICAL FIBERS

[75] Inventors: Jill A. Harvey; Daniel W. Hawtof, both of Wilmington; Henry A. Spicer, Wrightsville Beach, all of N.C.

[73] Assignee: Corning Incorporated, Corning, N.Y.

[21] Appl. No.: 877,626

[22] Filed: May 1, 1992

[51] Int. Cl.[5] ............................................. C03B 37/027
[52] U.S. Cl. .................................... 65/3.110; 65/12; 65/13
[58] Field of Search .............. 65/2, 3.11, 3.12, 12, 65/13

[56] References Cited

U.S. PATENT DOCUMENTS

| | | | |
|---|---|---|---|
| 1,126,436 | 11/1978 | Bailey | 65/13 X |
| 4,154,592 | 5/1979 | Bailey | 65/2 |
| 4,208,200 | 6/1980 | Claypoole et al. | 65/12 X |
| 4,400,190 | 8/1983 | Briere | 65/13 |
| 4,437,870 | 3/1984 | Miller | 65/12 |
| 4,514,205 | 4/1985 | Darcangelo et al. | 65/12 |
| 4,531,959 | 7/1985 | Kar et al. | 65/3.11 |
| 4,594,088 | 6/1986 | Paek et al. | 65/3.4 |
| 4,673,427 | 6/1987 | Van Der Giessen et al. | 65/3.12 |
| 4,988,374 | 1/1991 | Harding et al. | 65/2 |
| 5,059,229 | 10/1991 | Blankenship et al. | 65/2 |
| 5,160,359 | 11/1992 | Strackenbrock et al. | 65/3.12 |

FOREIGN PATENT DOCUMENTS 0321182 6/1989 European Pat. Off. .
62-246837 10/1987 Japan .

OTHER PUBLICATIONS

Montierth, "Optical Fiber Drawing Techniques", Optical Spectra, pp. 42–48, Oct., 1978.

Primary Examiner—Robert L. Lindsay
Attorney, Agent, or Firm—Bruce E. Kamerer

[57] ABSTRACT

A method and apparatus for drawing an optical waveguide fiber which minimizes fiber bow caused by differential stresses in the cladding layer of the fiber are disclosed. The fiber is drawn from a preform which is heated in a draw furnace. Gases introduced at the top of the furnace form a boundary layer adjacent to the fiber which passes through the furnace, along with the fiber, into a tube. The tube isolates the fiber from the ambient atmosphere so that the boundary layer of gases established in the furnace remains substantially uniform until the viscosity of the cladding layer of the fiber is high enough to minimize differential stresses around the circumference of the fiber.

14 Claims, 1 Drawing Sheet

METHOD AND APPARATUS FOR DRAWING OPTICAL FIBERS

BACKGROUND OF THE INVENTION

This invention relates to a method and apparatus for drawing an optical waveguide fiber from an optical waveguide preform with reduced diameter variations and reduced fiber bow.

Methods and devices for drawing optical waveguide fibers from optical waveguide preforms are well known in the art. The devices typically consist of a heat source for softening the preform, a fiber diameter measurement device, a unit for applying protective coatings to the fiber, and a fiber take up unit.

It has long been recognized that dimensional variations in optical waveguide fibers significantly impact optical properties. For example, it has been shown that a 3% relative variation in fiber diameter can result in an attenuation contribution of up to 0.8 dB in the first kilometer of length. Montierth, "Optical Fiber Drawing Techniques", Optical Spectra, pages 42–48, 43, October, 1978. As early as 1978, it was stated that fiber diameter variations would need to be reduced to a 3$\sigma$ range of ±1% or better to produce fibers which would compete with traditional copper twisted wire pairs in the telecommunications market. Id. at 43.

Another issue to which fiber drawing technology has been directed has been the improvement of fiber strength. For example, the cleanliness of the draw devices has been improved by the introduction of gas flows into the heat source or furnace. This gas flow prevents updrafts of ambient air from entering the furnace from the bottom of the furnace where the fiber exits the furnace. Such updrafts can carry particles into the vicinity of the softened portion of the preform. These particles can adhere to the softened preform or fiber and may result in weaker points in the fiber which may break below the required limit. The gas flow also flushes materials which may evolve from the furnace or heated preform. See, for example, Bailey U.S. Pat. No. 4,126,436.

However, the introduction of the gas causes diameter variations in the fiber if the gas is not uniformly heated when it reaches the tip of the preform from which fiber is drawn because of turbulence caused by the rapid non-uniform heating of the gas in the vicinity of the preform tip. One solution to this problem of non-uniform heating is the addition of a thin, cylindrically-shaped channel adjacent to the preform which causes the gas to be uniformly heated when it reaches the tip of the preform. See, for example, Bailey '436. Also, it has been shown that the presence in the furnace of a gas such as helium may stabilize the temperature at the tip of the preform from which the fiber is drawn. This stabilized temperature at the tip of the preform has been shown to reduce the diameter variation in the fiber. See, for example, Bailey U.S. Pat. No. 4,154,592.

We have found that differential cooling of a drawn fiber before the viscosity of the cladding layer of the fiber is high enough to substantially prevent differential stresses in the drawn fiber may cause the fiber to bend. This bending, or fiber "bow", causes difficulty when the fiber is spliced to other fibers, resulting in high loss splices which are detrimental to the overall performance of an optical fiber-based telecommunications system. The effects of bow are compounded in ribbon fiber applications where one ribbon array of fibers must be spliced to an opposing array.

We have also found that room air circulating around the fiber as it exits the draw furnace differentially cools the fiber. This causes a high frequency and random diameter oscillation; typically, this variation is less than that allowed in the specification for the fiber diameter. However, these diameter oscillations are of sufficient magnitude to hide an imperfection in the fiber known as an "airline". An airline is a hole in the fiber and is identified by a sudden change of small magnitude in fiber diameter.

We believe that bow results from differential cooling of the fiber before the viscosity of the cladding layer of the fiber is high enough to substantially prevent differential stresses in the drawn fiber. As a fiber cools, the cladding layer cools rapidly relative to the core region. This rapid cooling of the cladding layer induces high tensile stresses into the cladding layer of the fiber. Any differential cooling of the cladding layer before the viscosity is high enough to minimize differential stresses in the cladding layer will result in tensile stresses which are not uniformly distributed around the circumference of the fiber, thereby inducing bow.

During the drawing process, a boundary layer of helium (or other gas used in the furnace) forms adjacent to the fiber surface. This boundary layer will travel with the fiber through the exit of the furnace unless it is disrupted by other forces such as additional gases introduced intentionally or inadvertently to the furnace atmosphere. Since helium is an extremely efficient heat transfer medium, this boundary layer can provide substantially symmetric temperatures around the circumference of the fiber so long as the boundary layer remains intact. We believe that the disruption of the boundary layer by currents in the ambient atmosphere contributes to the differential cooling which can lead to fiber bow or diameter oscillations.

Van der Giessen et al. U.S. Pat. No. 4,763,427 discloses the use of nitrogen, argon, or oxygen to prevent thermally induced stresses in a fiber. These stresses increase the attenuation of the fiber and are caused by large temperature gradients when the fiber is cooled from about 1800° C. to about 1200° C. The gas is introduced into the furnace and is heated to approximately the temperature of the preform. As the fiber is drawn from the heated preform into an attached tube, the gas flows from the furnace into the tube. Additional gas is introduced into the tube at a flow rate to produce a laminar flow profile inside the tube. The length of the tube is dependent on draw speed as the fiber must be resident in the tube for at least 0.1 sec to achieve the desired affect. Col. 1, lines 54–65.

Japanese Patent Application No. 62-246,837 ("JPA '837") discloses the use of a tube at the fiber outlet end of a draw furnace to reduce the diameter variation of the fiber. Inert gas is introduced into the draw furnace. This inert gas is heated to a temperature close to that of the preform and flows out of the furnace into the tube as the fiber is drawn from the furnace into the tube. There is also a shutter provided between the furnace and the tube to prevent the heating of the tube by radiant heat from the furnace.

The tube in JPA '837 is equipped with a medium for cooling the inert gas flowing into the tube from the furnace. JPA '837 also discloses means for introducing additional inert gas directly into the tube. The inert gas in the tube is cooled such that the temperature difference between the inert gas exiting the bottom of the tube and the ambient atmosphere will be negligible. This is designed to prevent ambient air from entering the cooling tube, and therefore, the furnace. It is stated that the introduction of ambient air into the furnace causes turbulent flows in the vicinity of the tip of the preform from which fiber is drawn which will cause variation in the diameter of the fiber due to uneven temperature profiles within the turbulent flows.

Shang European Patent Application No. 0,321,182, published Jun. 21, 1989, discloses and claims a method o to decrease the temperature of a drawn fiber in a controlled manner to result in relatively low absorption losses in the fiber. In Shang the tubular recovery chamber is used to achieve this controlled decrease in temperature.

The tubular recovery chamber of Shang may be heated, or a gas at an elevated temperature may be introduced into the chamber. Col. 6, lines 50–53. The temperature at the exit of the chamber is about 200° C. Col. 7, lines 8–11. Shang discloses a seal between the draw furnace and the recovery chamber to prevent the ingress of uncontrolled ambient air into the chamber adjacent to the furnace. Col. 6, lines 18–21. Shang also discloses the addition of additional gas into the furnace near the seal between the furnace and the recovery chamber. This gas stream will tend to disrupt any boundary layer which may have formed adjacent the fiber, and it is believed that this disruption will cause differential cooling of the fiber which could result in diameter variations or fiber bow. Also, Shang does not disclose nor suggest the use of any device to prevent the ingress of ambient air to the exit end of the recovery chamber.

Shang is directed toward reducing draw-induced absorption losses caused by broken bonds in the glass structure. The recovery chamber of Shang causes the fiber to be exposed to a temperature profile Which allows the broken bonds to reestablish prior to exposure to the ambient air. This prevents "freezing" the broken bonds into the glass structure of the fiber.

Various other fiber cooling devices have been disclosed. These devices are used to cool the fiber for the purpose of applying protective coatings. Claypoole et al. U.S. Pat. No. 4,208,200 discloses a liquid fiber cooler comprising an elongated chamber through which the fiber passes. The elongated chamber is surrounded by a coolant jacket which lowers the temperature of the cooling liquid in the container.

Miller U.S. Pat. No. 4,437,870 discloses a fiber cooler comprising an elongated tube through which the fiber passes and into which cool dry helium is introduced.

Darcangelo et al. U.S. Pat. No. 4,514,205 discloses a fiber cooler comprising an elongated tube through which the fiber passes. As in Miller, Darcangelo et al. discloses the introduction of cool dry helium into the elongated tube. However, Darcangelo et al. further discloses the use of a chamber containing a liquified gas with a coil submerged therein through which the cool dry helium is passed before being flowed into the elongated tube.

Claypoole et al., Miller, and Darcangelo et al. all disclose fiber cooling devices which are located after the diameter measurement device. These cooling devices are, therefore, unsuited for reducing diameter variations in the fiber.

Paek et al. U.S. Pat. No. 4,594,088 discloses a liquid fiber cooler located between a draw furnace and an apparatus for coating the drawn fiber. It appears that the liquid fiber cooler of Paek et al. is located at a position after the fiber has passed through a fiber diameter measurement device, although Paek et al. only explicitly locates the liquid fiber cooler between the furnace and the coating device. Paek et al. does not disclose or suggest the use of furnace gases for cooling the fiber. Also, Paek et al. is concerned with cooling the fiber to a temperature below 80° C. prior to the application of protective coating materials.

SUMMARY OF THE INVENTION

It is an object of this invention to provide a method and apparatus for maintaining an essentially uniform boundary layer of furnace gases adjacent an optical waveguide fiber for cooling, in a substantially symmetric manner, the fiber from the drawing temperature to a temperature at which the viscosity of the cladding layer of the fiber is high enough to substantially prevent differential stresses in the cladding layer of the fiber.

It is another object of this invention to provide a method and apparatus for substantially symmetric cooling of an optical waveguide fiber by isolating the optical waveguide fiber from exposure to the uncontrolled ambient atmosphere until the viscosity of the cladding layer of the fiber is high enough to substantially prevent differential stresses in the cladding layer of the fiber.

It is another object of this invention reduce cooling-induced bow in drawn optical waveguide fibers.

DETAILED DESCRIPTION

Figure 1:
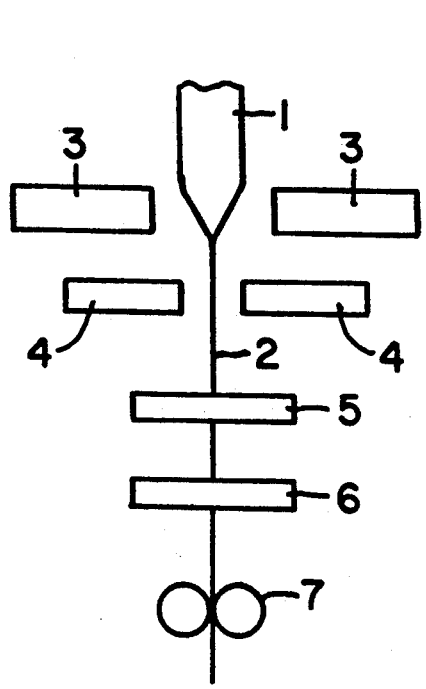
FIG. 1 is a schematic diagram of a typical fiber drawing system.

FIG. 1 depicts a typical fiber drawing system. An optical waveguide preform i is heated at one end by heating means 3 to a temperature at which optical waveguide fiber 2 is drawn from preform 1 by tractors 7. Preform 1 is supported by a support means (not shown) which also advances preform 1 into heating means 3 during the drawing process.

Fiber 2 passes through a diameter measurement device 4. Feedback from diameter measurement 4 is used by a control system (not shown) which controls the speed at which tractors 7 draw fiber 2 from preform 1. Coating device 5 applies a protective coating to fiber 2. Curing apparatus 6 cures the coating applied by coating device 5. Multiple layers of coating may be applied by employing successive pairs of coating device 5 and curing apparatus 6 in series between diameter measurement device 4 and tractors 7. For example, see Kar et al. U.S. Pat. No. 4,531,959.

Figure 2:
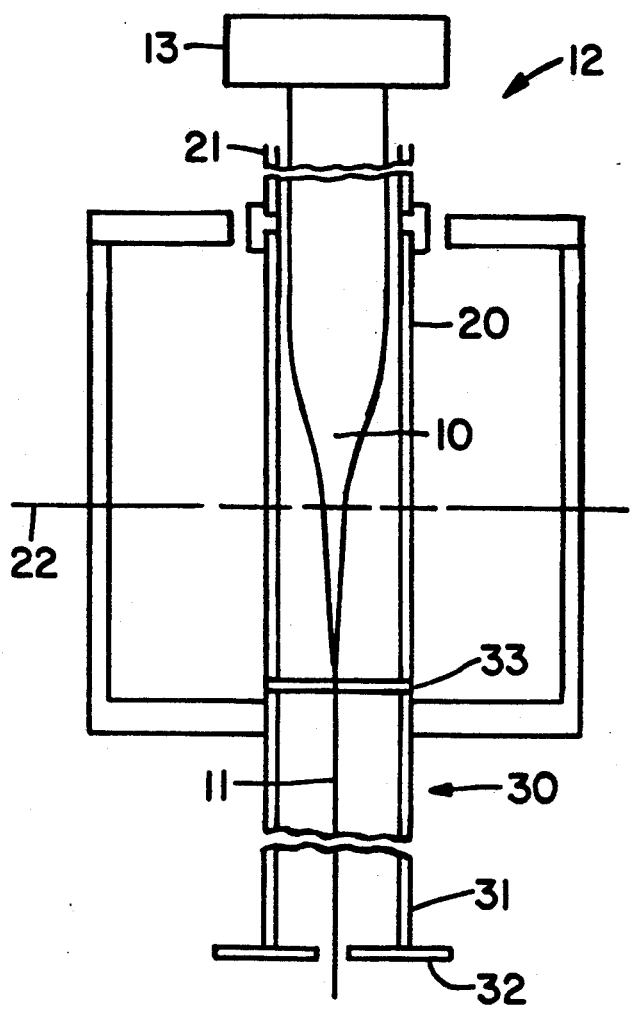
FIG. 2 is a cross-sectional view of a fiber drawing system embodying the present invention.

FIG. 2 shows a cross-sectional view of the present invention. Preform 10 is secured to any well known means for movable support 13. Preform 10 is heated in furnace 12. Furnace 12 represents an induction draw furnace well known in the art. See, for example, Montierth, "Optical Fiber Drawing Techniques", Optical Spectra, pages 42–48, 47, October, 1978. Muffle 20 which is formed of a susceptor material such as zirconia is heated by radio frequency coils (not shown) and enclosed by insulation (not shown). Broken line 22 represents the approximate location of the zone of highest temperature generated within muffle 20.

Upper muffle extension 21 is connected to muffle 20 to provide a gas-tight seal. The top of upper muffle extension 21 is sealed with respect to the ambient atmosphere by an assembly which is not shown. This assembly includes a gas inlet, also not shown, through which gases may be supplied to the top of upper muffle extension 21.

Extended lower muffle extension 30 comprises a tube 31 and flow isolator 32. Extension 30 is attached to muffle 20 using quartz ring 33 to provide a gas-tight seal. There is substantially unobstructed flow between muffle 20 and extension 30. Substantially unobstructed flow allows the flow patterns established inside muffle 20 to remain undisturbed as the fiber and adjacent gases pass from muffle 20 into extension 30.

The coating device, curing apparatus, and tractors, which are typically employed and well known in the art, are not shown in FIG. 2.

During the drawing operation, the tip of preform 10 is heated to the drawing temperature in the vicinity of broken line 21. Fiber 11 is drawn from the heated tip of preform 10.

Gas introduced at the top of upper muffle extension 21 typically consists of an inert gas, such as helium or argon. Since the top of upper muffle extension 21 is sealed as described above, the gas flows down through muffle 20 past preform 10 and through the point of highest temperature indicated by broken line 21. As the gas passes through muffle 20, it is heated to a temperature at or near the drawing temperature.

The heated gas continues to flow downward through muffle 20 and along with fiber 11. A boundary layer of gas is formed adjacent the fiber surface and travels with the fiber 11 through the furnace. Since extension 30 is connected to muffle 20 to provide substantially unobstructed flow between muffle 20 and extension 30, the boundary layer flows from muffle 20 into extension 30 as the fiber 11 moves from muffle 20 to extension 30. As the boundary layer flows through extension 30, it gradually cools in a substantially symmetric manner, thereby cooling fiber 11 in a substantially symmetric manner. We believe that fiber 11 need only be cooled to a temperature in the range of 1,000°-1,300° C. to ensure that the viscosity of the cladding layer of the fiber is high enough to substantially prevent differential stresses in the cladding layer of the fiber.

Cooling in a substantially symmetric manner requires cooling the fiber at equal rates around the circumference of the fiber such that the viscosity of the fiber changes at substantially the same rate. We believe that if the viscosity at one point on the circumference the fiber changes at a rate which is different from the rate of change of viscosity at another point on the circumference of the fiber, differential stresses will be induced which will cause fiber bow. We believe that substantially symmetric cooling of the fiber will minimize the differential stresses induced in the fiber, thereby minimizing bow due to differential stresses.

Flow isolator 32 can comprise, for example, shutters or an adjustable iris. By closing flow isolator 32 down to close proximity of fiber 11, the ambient atmosphere can be substantially prevented from entering the bottom of extension 30. This helps prevent differential cooling of fiber 11 by the ambient atmosphere before the viscosity of the cladding layer of the fiber is high enough to substantially prevent differential stresses in the cladding layer of the fiber. As the fiber exits through flow isolator 32 into the ambient atmosphere, the boundary layer of gas adjacent the fiber exits through flow isolator 32 with the fiber. Currents in the ambient atmosphere will disrupt the boundary layer of gas adjacent the fiber surface.

In one embodiment, the draw rate is about 9 meters per second. The tension in the fiber is controlled to a constant value of about 90 grams by a tension control system not shown in the drawings. This results in a drawing temperature in the range of about 2,100-2,300° C. The gas introduced into the furnace comprises helium at a flow rate of about 3.1 SLPM.

The extension is an aluminum tube about 20 inches (50.8 cm) in length and about 2.75 inches (7.0 cm) inside diameter. The tube had a slot cut in it with a piece of glass sealed into the slot to allow the draw operators to see the fiber during the drawing operation. After the fiber is initially pulled through the iris at the exit of the tube, the iris is closed to leave an opening about 0.5 inches (1.25 cm) in diameter.

The resulting fiber has a nominal diameter of 125 $\mu$m with a standard deviation of 1 $\mu$m. Using the present invention, measured values of fiber bow are nominally 10,000 mm radius of curvature. Without the use of extension 30, fibers run under similar conditions to the preferred embodiment described above exhibit measured bow of about 3,800 mm radius of curvature. There is no standardized bow measurement. The values above were obtained by measuring the offset of a 10 mm overhang length of fiber.

The length of extension 30 will increase as draw rate increases to provide substantially symmetric cooling of the fiber to a temperature in the range of 1,000°-1,300° C. to ensure that the viscosity of the cladding layer of the fiber is high enough to substantially prevent differential stresses in the cladding layer of the fiber. The diameter of the extension 30 can be modified to accommodate changes in the geometry (diameter, length or volume) of the furnace 12 or to accommodate changes in the geometry of the preform 10.

Figure 3:
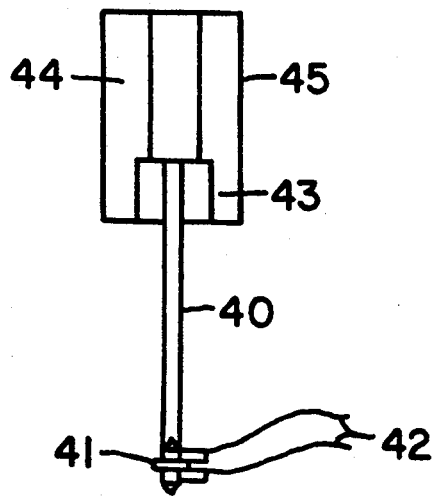
FIG. 3 is a cross-sectional view of a fiber drawing system showing another embodiment of the present invention.
Figure 4:
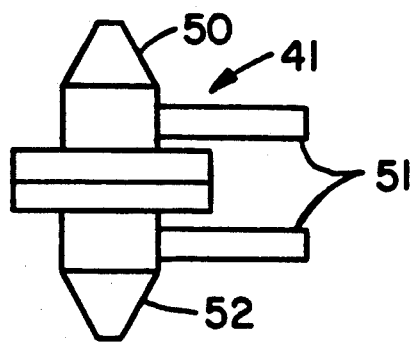
FIG. 4 is a detail drawing of a nozzle assembly.

An earlier version of the present invention is shown in FIG. 3. Extension 40 is a glass tube 26 inches (66.0 cm) in length with a 0.875 inch (2.2 cm) inside diameter and is inserted into lower muffle extension 43. Lower muffle extension 43 is attached to muffle 44. Muffle 44 and lower muffle extension 43 make up the draw furnace 45. A preform (not shown) is heated inside furnace 45. A preform (not shown) is heated inside Nozzle assembly 41 includes gas inlet lines 42 which allowed the introduction of additional gas into the exit end of extension 40. Nozzle assembly 41 is shown in more detail in FIG. 4. Upper nozzle 50 is inserted into the lower muffle extension (not shown). Inlet ports 51 allow introduction of gas into the nozzle area from gas inlet lines (not shown). The fiber (not shown) passes through the assembly 41 and exits through lower nozzle 52. While this embodiment showed some improvement in fiber bow over fiber produced without any extension, we believe that both the introduction of additional gas at the exit end of extension 40, when combined with the small diameter of extension 40 results in disruption of the boundary layer of gas adjacent the fiber. This disruption causes differential cooling of the fiber which results in higher bow.

The present invention has been particularly shown and described with reference to the preferred embodiments thereof. However, it will be understood by those skilled in the art that various changes may be made in the form and details of these embodiments without departing from the true spirit and scope of the invention as defined by the following claims.

We claim:

1. An apparatus for drawing an optical waveguide fiber from an optical waveguide preform, comprising:
   a. means for heating one end of said preform to its softening temperature;
   b. means for supporting said preform, said supporting means allowing relative movement between said preform and said heating means;
   c. means for introducing gas into said heating means above said one end of said preform; and
   d. means for cooling said fiber, said cooling means attached to said heating means to provide substantially unobstructed fluid communication between said heating means and said cooling means for the gas introduced into said heating means, wherein a boundary layer of said gas formed adjacent to said fiber is substantially uniform in the region where said fiber is substantially cooled to a temperature at which the viscosity of the cladding layer of the fiber is high enough to substantially prevent differential stresses in the cladding layer of the fiber,
   wherein said cooling means further comprises a tube attached to said heating means such that the fiber is drawn through said heating means into said tube and out a fiber outlet of said tube, said tube including an isolating means to substantially prevent exposure of the fiber therein to a current of ambient atmosphere.

2. The apparatus of claim 1, wherein said isolating means comprises an adjustable iris at the fiber outlet of said tube.

3. The apparatus of claim 1, wherein the inside diameter of said tube is substantially the same as the inside diameter of said heating means.

4. The apparatus of claim 1, wherein the inside diameter of said tube is substantially smaller than the inside diameter of said heating means.

5. The apparatus of claim 1, wherein the temperature of the fiber at which the fiber is exposed to ambient atmosphere is in the range of about 1,000° C. to about 1,300° C.

6. An apparatus for drawing an optical waveguide fiber from an optical waveguide preform, comprising:
   a. means for heating one end of said preform to its softening temperature;
   b. means for supporting said preform, said supporting means allowing relative movement between said preform and said heating means;
   c. means for introducing gas into said heating means above said one end of said preform; and
   d. means for cooling said fiber, said cooling means attached to said heating means to provide substantially unobstructed fluid communication between said heating means and said cooling means, wherein said cooling means substantially prevents different cooling of said fiber,
   wherein said cooling means further comprises a tube attached to said heating means such that the fiber is drawn through said heating means into said tube and out a fiber outlet of said tube, said tube including an isolating means to substantially prevent exposure of the fiber therein to a current of ambient atmosphere.

7. The apparatus of claim 6, wherein said isolating means comprises an adjustable iris at the fiber outlet of said tube.

8. The apparatus of claim 6, wherein the inside diameter of said tube is substantially the same as the inside diameter of said heating means.

9. The apparatus of claim 6, wherein the inside diameter of said tube is substantially smaller than the inside diameter of said heating means.

10. The apparatus of claim 6, wherein the temperature of the fiber at which the fiber is exposed to ambient atmosphere is in the range of about 1,000° C. to about 1300° C.

11. A method for drawing an optical waveguide fiber from an optical waveguide preform, comprising the steps of:
    a. heating, in a furnace, one end of said preform to its softening temperature;
    b. exposing said heated preform to a gas in the furnace;
    c. drawing a fiber from the softened end of the preform into a cooling chamber attached to the furnace and out a fiber outlet of said cooling chamber, said cooling chamber fluidly communicating with the furnace;
    d. utilizing the gas flow between the furnace and said cooling chamber to symmetrically cool the fiber to a temperature at which the viscosity of the cladding layer of the fiber is high enough to substantially prevent differential stresses in the cladding layer of the fiber; and
    e. isolating the atmosphere of said cooling chamber from the ambient atmosphere by constricting the opening at the fiber outlet of said cooling chamber and by utilizing the gas flow between the furnace and the cooling chamber.

12. The method of claim 11, wherein said isolating step further comprises adjusting an adjustable iris attached to the fiber outlet of said cooling chamber to constrict the opening at the fiber outlet of the cooling chamber.

13. The method of claim 11, wherein the gas to which the preform is exposed comprises helium.

14. The method of claim 11, wherein the gas is introduced at the top of the furnace and is heated as it passes through said furnace with the fiber.

* * * * *

UNITED STATES PATENT AND TRADEMARK OFFICE
CERTIFICATE OF CORRECTION

PATENT NO. : 5,284,499
DATED : February 8, 1994
INVENTOR(S) : J. A. Harvey; D. W. Hawtof and H. A. Spicer It is certified that error appears in the above-indentified patent and that said Letters Patent is hereby corrected as shown below:

Col. 6, line 50, "A preform" should read -- and a fiber --.

Col. 6, line 50, "is heated inside" should read -- is drawn therefrom. --.

Col. 7, line 23, after "substantially" insert -- symmetrically --.

Signed and Sealed this

Thirtieth Day of August, 1994

Attest:

BRUCE LEHMAN

*Attesting Officer*     *Commissioner of Patents and Trademarks*